(12) United States Patent
Serocki et al.

(10) Patent No.: US 6,308,322 B1
(45) Date of Patent: Oct. 23, 2001

(54) METHOD AND APPARATUS FOR REDUCTION OF INDIRECT BRANCH INSTRUCTION OVERHEAD THROUGH USE OF TARGET ADDRESS HINTS

(75) Inventors: Steven Serocki, Campbell; Anne Marie Holler, Santa Clara, both of CA (US)

(73) Assignee: Hewlett-Packard Company, Palo Alto (*) Notice: Subject to any disclaimer, the term of this patent is extended or adjusted under 35 U.S.C. 154(b) by 0 days.

(21) Appl. No.: 09/286,828

(22) Filed: Apr. 6, 1999

(51) Int. Cl.[7] .................................................. G06F 9/45
(52) U.S. Cl. .................... 717/9; 717/4; 717/7; 712/240
(58) Field of Search ................................ 717/4, 5, 7, 9, 717/10; 712/239, 240, 227

(56) References Cited

U.S. PATENT DOCUMENTS

| | | | |
|---|---|---|---|
| 5,142,634 | 8/1992 | Fite et al. | 712/240 |
| 5,596,732 | 1/1997 | Hosoi | 717/9 |
| 5,655,122 | 8/1997 | Wu | 717/5 |
| 5,659,752 | 8/1997 | Heisch et al. | 717/4 |
| 5,687,360 | 11/1997 | Chang | 712/240 |
| 5,742,804 | * 4/1998 | Yeh et al. | 712/237 |
| 5,768,592 | * 6/1998 | Chang | 717/4 |
| 5,778,423 | * 7/1998 | Sites et al. | 711/118 |
| 5,805,878 | * 9/1998 | Rahman et al. | 712/239 |
| 5,857,105 | * 1/1999 | Ayers et al. | 717/8 |
| 5,878,254 | * 3/1999 | Shimada et al. | 717/5 |
| 5,887,159 | * 3/1999 | Burrows | 712/226 |
| 5,940,622 | * 8/1999 | Patel | 717/9 |
| 6,029,228 | * 2/2000 | Cai et al. | 711/137 |
| 6,092,188 | * 7/2000 | Corwin et al. | 712/239 |
| 6,158,047 | * 12/2000 | Le et al. | 717/5 |
| 6,167,509 | * 12/2000 | Sites et al. | 712/237 |
| 6,178,498 | * 1/2001 | Sharangpani et al. | 712/239 |

OTHER PUBLICATIONS

Chen et al., "A Performance Study of Software and Hardware Data Prefetching Schemes," Proceedings of the 21st Annual Int'l Symposium on Computer Architecture, Apr. 18–21, 1994, pp 223–232.*

Chi et al., "Compiler Driven Data Cache Prefetching for High Performance Computers," Proceedings of 1994 IEEE Region 10's Ninth Annual International Conference, TENCON '94.*

Theme: frontiers of Computer Technology, Aug. 22–26, 1994, pp 274–278 vol. 1.*

Wu et al., "Static Branch Frequency and Program Profile Analysis," Proceedings of the 27th IEEE/ACM Annual Int'l Symposium on Microarchitecture, Nov. 20–Dec. 2, 1994, pp 1–11.*

* cited by examiner

*Primary Examiner*—Mark R. Powell
*Assistant Examiner*—Than Q. Dam

(57) ABSTRACT

The present invention efficiently and accurately predicts indirect branch target addresses in computer code, thereby significantly increasing processing speed. According to the present invention, an optimizing compiler inserts indirect branch target address hints in advance of their corresponding indirect branches, thereby allowing the processor time to execute and utilize the hints. The present invention avoids the processor pipeline flushes associated with previous hardware solutions by allowing more accurate prediction of indirect branch target addresses. In addition, the present invention is not dependent upon having a large cache memory associated with the microprocessor or repeatedly encountering the same indirect branch within a certain preset period of time. Moreover, the present invention avoids the performance and compile time problems of the software solutions of the prior art by maintaining the indirect branch constructs.

32 Claims, 6 Drawing Sheets

METHOD AND APPARATUS FOR REDUCTION OF INDIRECT BRANCH INSTRUCTION OVERHEAD THROUGH USE OF TARGET ADDRESS HINTS

FIELD OF THE INVENTION

The present invention relates to optimizing compilers and, more specifically, to the use of optimizing compilers to reduce the degradation of processing speed resulting from indirect branches in computer code.

BACKGROUND OF THE INVENTION

The speed of microprocessors has been increased dramatically over recent years. One reason for this improvement in speed is that microprocessors have become more deeply "pipelined." Pipelining refers to the division of labor by a microprocessor that allows it to operate much like an assembly line. For example, the popular Pentium® processor from Intel® divides its workload into five stages. As shown in FIG. 1, the Pentium® first performs a prefetch of an instruction in memory. While that first instruction, A, is passed to the first stage of decoding, the microprocessor prefetches the next instruction, B. Then, while instruction A is in the second decoding stage and instruction B is in the first decoding stage, the processor prefetches instruction C. This continues until all five stages of the processor are loaded, at which time the processor is essentially executing five different instructions at once. Obviously, pipelining instructions in this manner provides great benefit to overall system speed.

One factor that can severely hamper the performance of deeply pipelined processors, however, is the presence of branches in the computer code being executed by the processor. Generally, there are two types of branches: direct and indirect. A direct branch (such as an if-then-else statement) conditions the flow of execution control in a program on the value of a particular variable. Depending on the value of the variable, the execution flow of control will fall through to the next instruction in the sequence stored in memory, or it will "take the branch." If the branch is "Taken," the execution flow of control will jump to an instruction at an out-of-sequence address.

As will be appreciated, direct branches cause problems for deeply pipelined processors because instructions are not always executed in the order in which they are stored in memory. For example, with reference to FIG. 1, assume that instruction A is a direct branch instruction and that, depending on the value of some variable, execution flow of control will either fall through to instruction B, or, if the branch is taken, jump to instruction G. The processor is not able to determine until late in the pipelining of instruction A (i.e., execution and write back of instruction A) whether the branch to instruction G will be taken. By that time, as shown, instructions B-F are already in the pipeline. Therefore, all of the information in the pipeline must be "flushed," and restarted with the prefetch of instruction G. Such pipeline flushes significantly degrade processor performance. Alternatively, some processors are designed to "stall" during execution of direct branch instruction A until it can be determined whether the branch is taken. During a stall, no further instructions enter the pipeline, which can also have significant negative effect on processor speed.

Programmers and hardware engineers have attempted to address the problems caused by direct branches by devising direct branch "prediction" schemes. These schemes are sometimes accomplished by a compiler. A compiler is a computer program that reads a program written in one language (the source language) and translates it into an intermediate code, which it then optimizes and assembles into an object code. The object code is then linked by a linker to create an executable object code that is readable by a computer. Source code is generally written in languages that are humanly readable, such as FORTRAN, C, and PERL. Object code is generally comprised of assembly language or machine language for a target machine, such as an Intel microprocessor-based computer.

Modem compilers are designed to optimize source code as it is translated into object code. One method of optimization, is through direct branch prediction, whereby the optimizing compiler attempts to predict whether each branch in the computer code is Taken Or Not Taken. Branch prediction in the compiler is accomplished using one or more heuristics, which can be either profile-based or rule-based. FIG. 2A illustrates a prior art profile-based branch prediction method. Source code 10 is first compiled 20. During this compilation 20, in addition to translating the source code 10 into an intermediate code, the compiler "instruments" the intermediate code to collect profile data on all of the direct branches in the code. "Instrumenting" refers to the practice of adding code to trace the performance of direct branches during execution. The intermediate code is then assembled into an object code and linked 30 to create an instrumented executable object code 40. The instrumented executable object code 40 is then executed 50 using a representative workload 60. During execution, the performance of the direct branches in the code is traced and analyzed 70. That profile information is then fed back to the compiler, which predicts whether each direct branch in the code is Taken Or Not Taken and inserts those predictions into the code. Once the code is again linked 30, it results in a direct-branch optimized executable object code 80.

Alternatively, as shown in FIG. 2B, the direct branches can be predicted using rule-based heuristic(s). Here, the source code 90 is first compiled using 100 rule-based direct branch heuristic(s). A rule-based heuristic is a static rule or assumption. For example, a simple rule-based heuristic in this context is that branches are always Taken. A variety of other rule-based heuristics can be employed alone or in combination, as explained in U.S. Pat. No. 5,655,122, issued to 3Youfeng Wu on Aug. 5, 1997, which is hereby incorporated by reference. After the source code is compiled 100, it is linked 120 to create a direct-branch optimized executable object code 130.

It will be appreciated that the correct prediction of whether a direct branch is Taken Or Not Taken can greatly increase the speed of deeply pipelined processors. In the example above with respect to FIG. 1, if it is correctly predicted that the branch from Instruction A to Instruction G will take place, the processor will begin fetching Instruction G directly after Instruction A, thereby avoiding a processor flush or stall. Of course, if the prediction is incorrect, processor flushes are still likely.

In addition, even when a branch is correctly predicted Taken, fetching at the branch target address cannot begin immediately because the branch target address must be calculated. Branch Taken/Not Taken predictions are typically inserted as part of the direct branch itself—not ahead of the direct branch. Because a branch target address is, by definition, not the next sequential address in memory, the processor must add or subtract to the current program counter to calculate the branch address when the branch is predicted Taken. This causes the processor pipeline to stall during calculation even upon a correct prediction of a direct branch Taken.

Considerably less attention has been paid to processor stalls or flushes caused by indirect branches. Indirect branches differ from direct branches in that they are always "Taken." A typical indirect branch in a source language such as C reads as follows:

```
Source Code:
    Switch (x)
    [
        case A:
                        <code for target A>
        case B:
                        <code for target B>
        case C:
                        <code for target C>
    ]
```

Through this indirect branch, execution flow of control is switched according to the value of x to one of the target addresses A, B, or C. The indirect branch is always "Taken" in the sense that execution flow of control will always switch to one of the target addresses A, B, or C—none of which are necessarily the next target address stored in memory. Therefore, the direct branch hinting mechanisms of the prior art, which predict only whether a branch is Taken, are inapplicable to indirect branches. Indirect branches, however, can still degrade processing speed by causing the processor pipeline to stall while the indirect branch variable (variable x above) is evaluated and the address of the correct target is calculated.

There have been some attempts to remedy the problems caused by indirect branches through both hardware and software. A typical hardware solution is to provide a cache memory that stores the last target address used for a particular indirect branch. When the indirect branch is encountered, the processor begins to fetch from the predicted target address stored in the cache memory while the indirect branch variable is being evaluated. If the indirect branch switches to the same target address as the last time it was executed, processing speed is increased in that calculation of the target address is unnecessary and pipeline stalls are avoided. This method of indirect branch target address hinting, however, is often extremely inaccurate, especially where the indirect branch does not tend to switch to the same target consecutively (which has been found to be the case for many indirect branches). In addition, if the cache memory is not large enough, often the last address used for a particular indirect branch is forced out of the cache memory before that indirect branch is encountered again. Indeed, this method of indirect branch target address prediction is often more detrimental than helpful and can result in processing speeds that are lower than if no prediction mechanism were used at all.

Software schemes to minimize the effect of indirect branches are often employed in optimizing compilers but typically involve restructuring the code to avoid executing indirect branches. For example, cascaded if-then-else constructs are often substituted for indirect branches. In other words, indirect branches are transformed into a series of direct branches. This approach can be effective where an indirect branch is heavily biased in terms of flow of control because the if-then-else statements can be cascaded in such a way that direct branches are never Taken. However, where flow of control is more evenly balanced in an indirect branch and whenever the most-likely target address is not actually Taken, this software solution can adversely impact execution time and will almost always increase compilation time.

What is needed is a method and apparatus for accurately hinting the target address for indirect branches.

What is needed is a method and apparatus for hinting the target addresses of indirect branches that avoids microprocessor stalls and flushes.

What is needed is a method and apparatus for hinting the target addresses of indirect branches that is not limited by hardware constraints.

What is needed is a method and apparatus for hinting the target addresses of indirect branches that can be accomplished without necessarily converting the indirect branches into direct branch constructs.

SUMMARY OF THE INVENTION

The present invention accomplishes these objectives by efficiently and accurately predicting indirect branch target addresses, thereby significantly increasing processing speed. The present invention avoids the processor pipeline flushes associated with the previous hardware solutions by allowing more accurate prediction of indirect branch target addresses. In addition, the present invention is not dependent upon having a large cache memory associated with the microprocessor or encountering the same indirect branch within a certain preset period of time. Moreover, the present invention avoids the performance and compile time problems of the software solutions of the prior art by maintaining the indirect branch constructs.

The method of the present invention involves inserting indirect branch target address hints in advance of their corresponding indirect branches, thereby allowing the processor time to execute and utilize the hints. In addition, the hints can be placed close enough to their corresponding indirect branches to avoid the cache-overwriting problems of prior art hardware solutions. The hints, themselves, may be generated using either profile-based or rule-based heuristic(s) (or both) and comprise the most-likely target address for a particular indirect branch. Valuable processing time is saved by calculating the most-likely target address in advance of the indirect branch. In addition, the recent emergence of wide-issue microprocessors makes it possible to "hide" the processing cost of the target address hint by executing the hint in parallel with other instructions.

When the hints are generated using profile-based heuristics, the predictions of the most-likely target addresses are preferably evaluated to determine the likelihood of their accuracy. If the prediction of a most-likely target address does not meet a certain likelihood threshold, the profile-based hint is not employed. In that instance, rule-based hints may be used for the indirect branch in question, or the methods of the present invention may be used in conjunction with each other and/or with prior art methods (e.g., converting the indirect branch into a series of cascaded if-then-else statements). Other features of the present invention are further explained in the following description of the invention and accompanying figures.

DETAILED DESCRIPTION OF THE INVENTION

Figure 1:
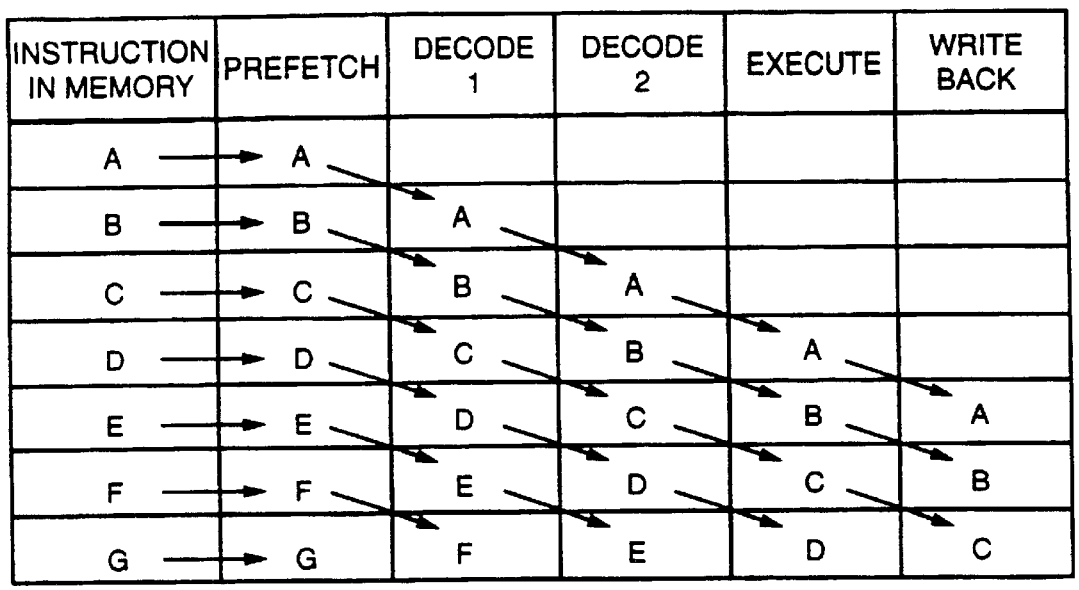
FIG. 1 is a table illustrating the operation of a typical pipelined processor of the prior art.
Figure 3:
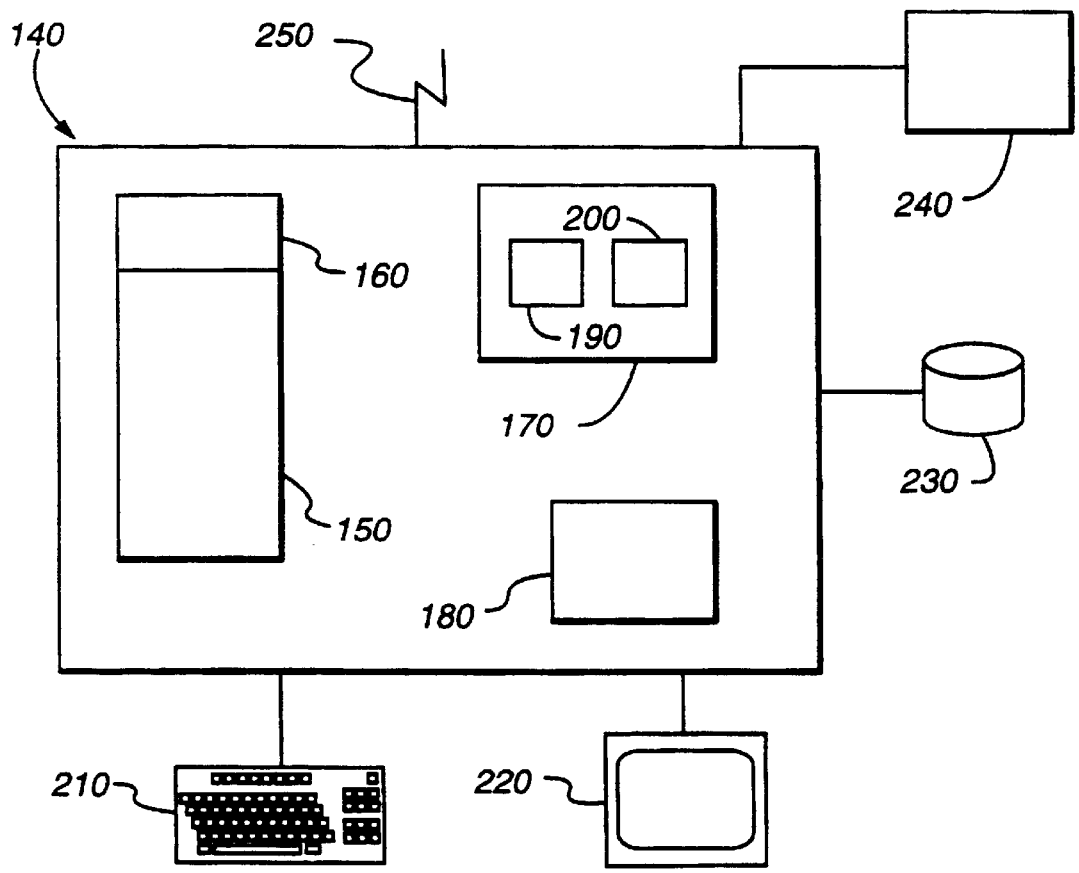
FIG. 3 is an illustration of a computer system according to the present invention.
Figure 2A:
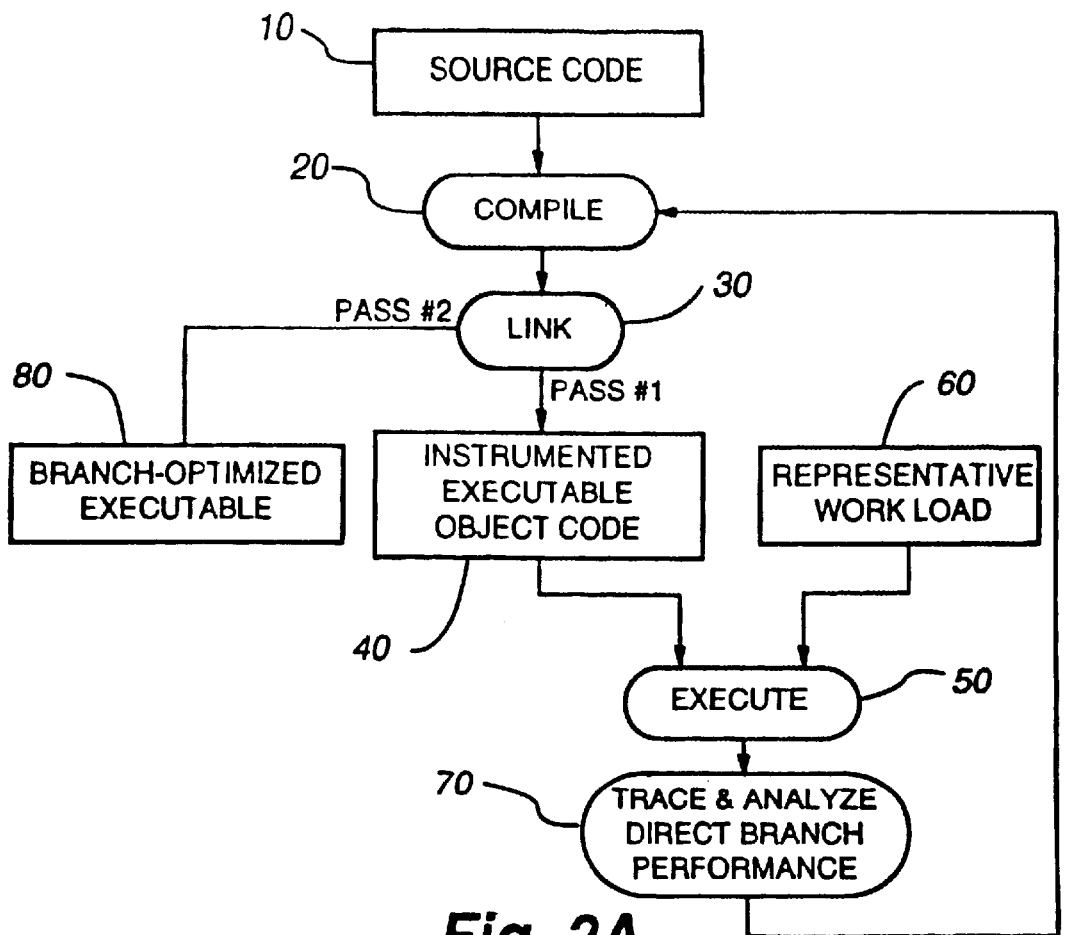
FIG. 2A is a flow chart illustrating a prior art method of profile-based optimization and compilation of computer code having direct branches within it.
Figure 2B:
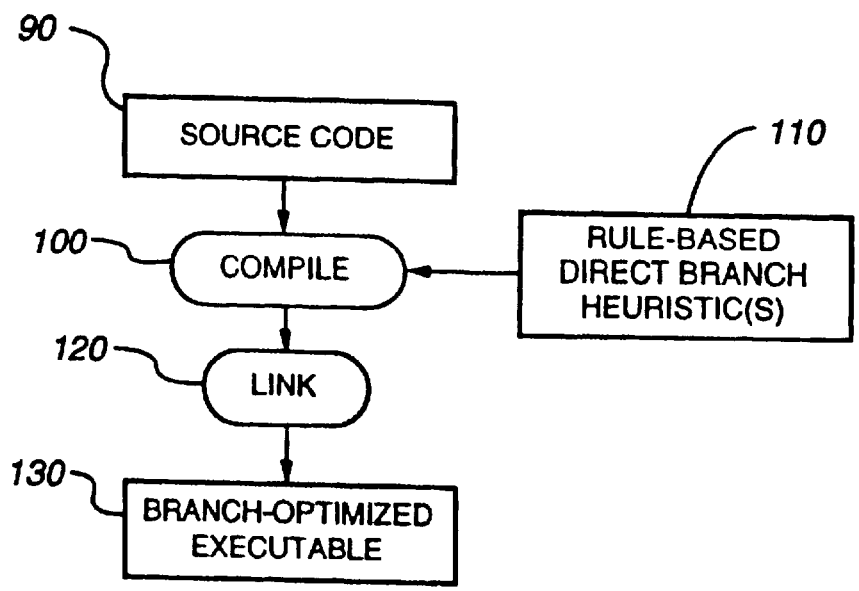
FIG. 2B is an illustration of a prior art method of the rule-based optimization and compilation of computer code having direct branches within it.

FIG. 3 is a block diagram of a computer system 140 that is used to implement the methods and apparatus embodying the present invention. The computer system 140 includes as its basic elements: a CPU 150 with associated cache memory 160, a main memory 170, and an I/O controller 180. The main memory 170 includes within it a compiler 190 and a linker 200 in the form of computer programs. The CPU 150, memory 170, and I/O controller 180 are all connected via a bus structure. The I/O controller 180 controls access to and information from external devices such as a keyboard 210, a monitor 220, permanent storage 230, and removable media unit 240. In addition, the computer system 140 may be connected through a network connection 250 to other computer systems.

It should be understood that FIG. 3 is a block diagram illustrating the basic elements of a computer system. This figure is not intended to illustrate a specific architecture for the computer system 140 of the present invention. For example, no particular bus structure is shown because various bus structures known in the field of computer design may be used to interconnect the elements of the computer system 140 in a number of ways, as desired. The CPU 150 may be comprised of a discrete arithmetic logic unit (ALU), registers, and control unit or may be a single device in which these parts of the CPU 150 are integrated together, such as in a microprocessor. Moreover, the number and arrangement of the elements of the computer system 140 may be varied from what is shown and described in ways known in the art (i.e., multiple CPUs, client server systems, computer networks, etc.) It is preferred, however, that the computer system of the present invention employ a wide-issue CPU (such as the Merced microprocessor due to be available from Intel in the summer of 2000) that is capable of taking full advantage of the indirect branch target address hints contemplated by the present invention. The operation of the computer system depicted in FIG. 3 is described in greater detail in relation to the method of the present invention illustrated in FIGS. 4 through 6.

Figure 4:
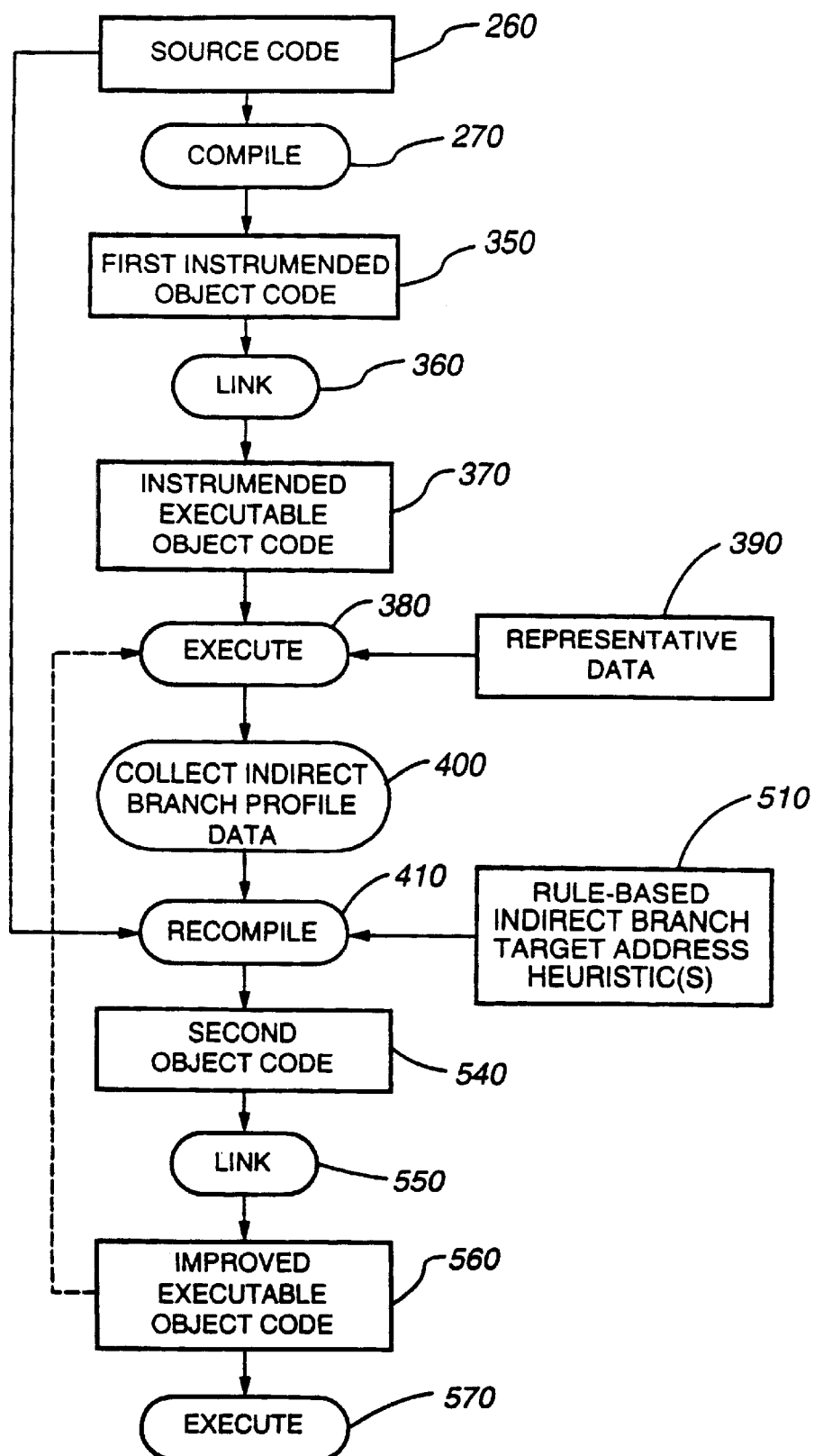
FIG. 4 is an illustration of a preferred method according to the present invention of generating and utilizing indirect branch target address hints.
Figure 5A:
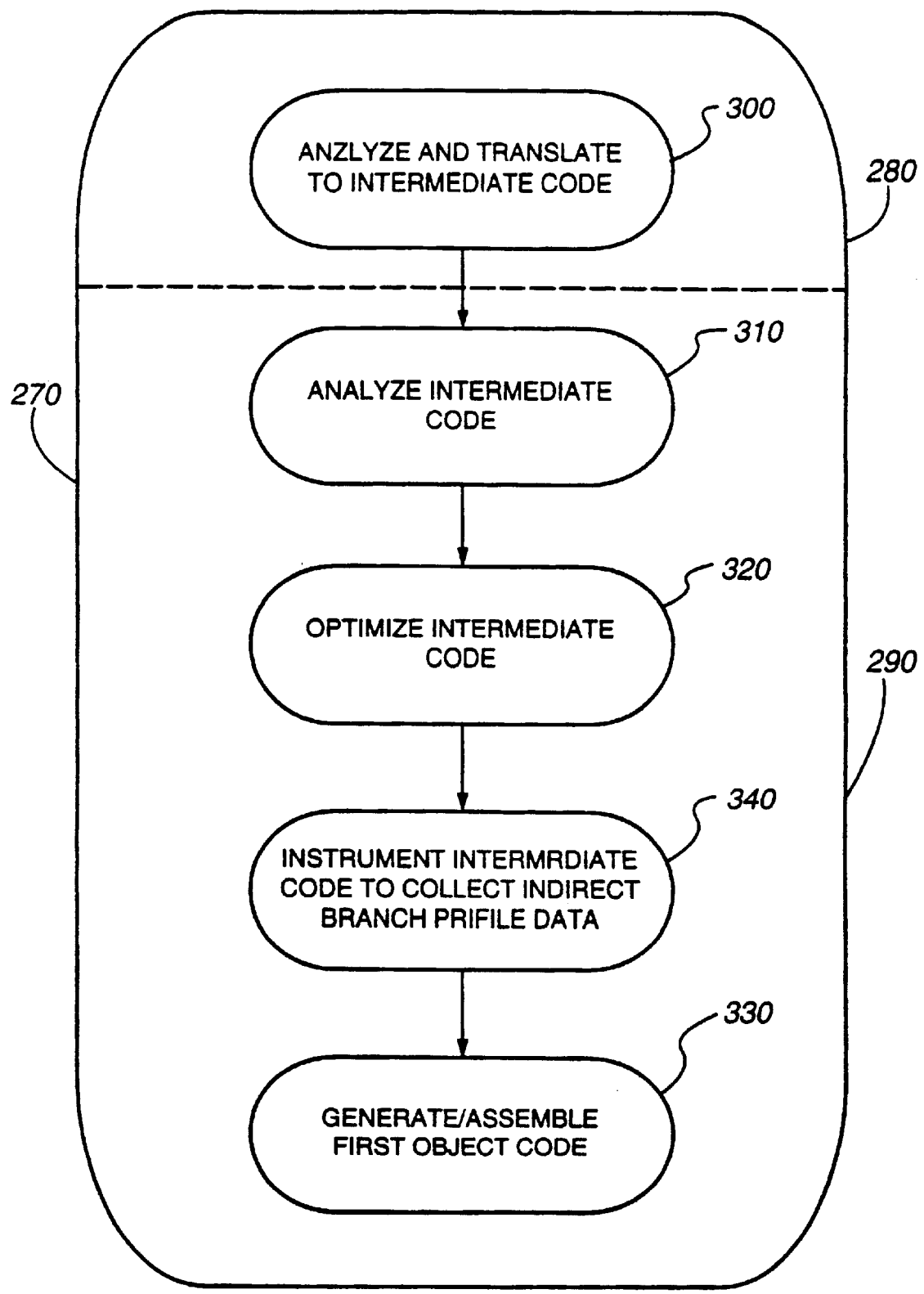
FIG. 5A is a more detailed illustration of the compile step shown in FIG. 4.

FIG. 4 is a flowchart showing the basic operation of the present invention. A source code 260, which is either stored in main memory 170 or imported from external devices, is read 270 by the compiler 190. As discussed, the source code 260 is written in a humanly readable computer language, such as C. Operation of the compiler 190 is described in greater detail with respect to FIG. 5A. The compiler 190 generally includes a front end 280 that is conventional in nature and may include a lexical analyzer, a syntax analyzer, and a semantic analyzer. The front end 280 of the compiler 190 also includes a code generator that generates an intermediate code from the source code 260 based on these analyses 300. The back end 290 of the compiler 270 includes an intermediate code analysis portion 310, an optimization portion 320, and a code generator portion 330. The code analysis portion 310 of the compiler 270 is also conventional and analyzes the intermediate code and partitions it into basic blocks. Typically, each function and procedure in the intermediate code is represented by a group of related basic blocks. As understood in the art, a basic block is a sequence of consecutive statements in which flow of control enters at the beginning and leaves at the end without branching except at the end. The basic blocks of the intermediate code are then stored by the compiler into basic block data structures.

The optimization portion 320 of the compiler's back end 290 performs a number of conventional optimizations. For example, rule-based direct branch prediction heuristics can be employed. The compiler also "instruments" 340 the intermediate code to collect indirect branch data. Instrumentation of code refers to the process of adding code that generates specific information to a log during execution. Instrumentation allows collection of the minimum specific data required to perform a particular analysis. General purpose trace tools can also be used as an alternative method for collecting data. General purpose trace tools, however, collect more information about the execution of the code than is necessary to analyze the code for indirect branch target address statistics. Therefore, specific instrumentation of the code to collect indirect branch target address information is preferred. Once the intermediate code has been conventionally optimized and instrumented, the code generator in the back end 290 of the compiler 190 is used to generate and assemble object code 330.

Referring back to FIG. 4, the object code 350 is then sent to the linker 200, which links 360 and appropriately orders the object code 350 according to its various functions to create an instrumented executable object code 350. Those skilled in the art will recognize that the object code can also be directly instrumented by a dynamic translator. In that instance the compiler need not instrument the intermediate code. As used herein, "instrumenting" refers broadly to any method by which the code is arranged to collect data relevant to the observed behavior of indirect branches, including both dynamic translation and instrumentation during compilation.

The instrumented executable code 370 is executed 380 by the CPU 150 using representative data 390. Preferably, the representative data 390 is as accurate a representation as possible of the typical workload that the source code 260 was designed to support. Use of varied and extensive representative data 390 will produce the most accurate profile data regarding the indirect branch target addresses. During execution 380 of the instrumented executable code 370 using representative data 390, statistics on indirect branch target addresses are collected 400. This collection, or "trace", of indirect branch target address statistics 400 is enabled by the instrumentation of the object code and can be accomplished in a variety of ways known in the art, including as a subprogram within the compiler 190 or as a separate program stored in memory 170. It will also be recognized by those of ordinary skill in the art that the instrumentation of code 340 and collection of profile data on indirect branches 400 can be performed at the same time profile data on direct branches is being generated and collected.

After the indirect branch profile data is collected 400, it is sent back to the compiler 190 where the source code is recompiled 410 using that information. Recompilation 410 is detailed in FIG. 5B. It is possible that when the source code 260 was originally translated to intermediate code during the original compilation 270, the intermediate code was saved in memory 170. If this is true, the front end compilation 420 need not be repeated to generate an intermediate code 430 from the source code 260. As used herein, therefore, "recompiling the source code" refers to both recompiling directly from the source code 260 or from the intermediate code generated during some previous compilation.

Figure 5B:
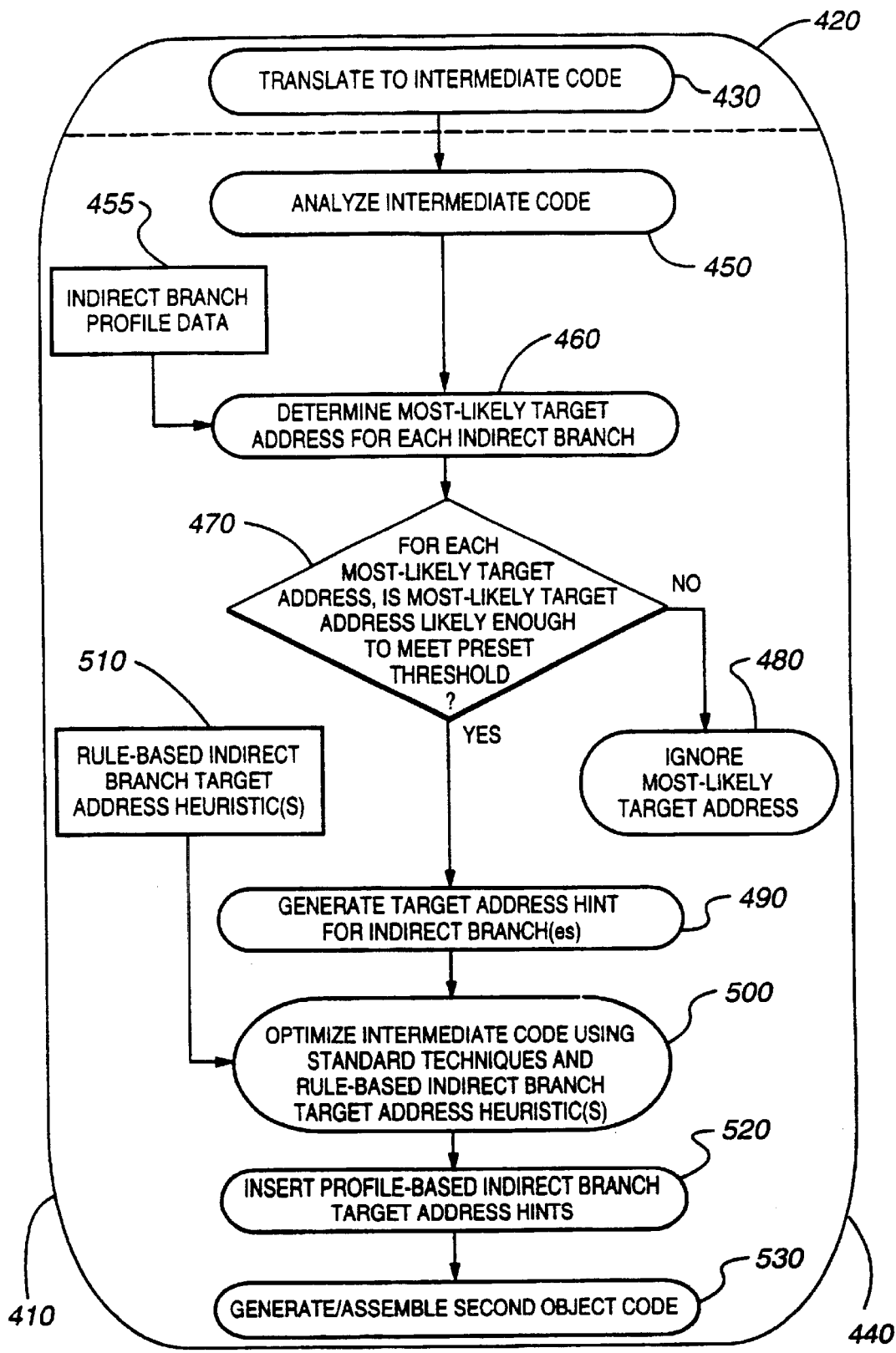
FIG. 5B is a more detailed illustration of the re-compile step shown in FIG. 4.

If the intermediate code was not previously saved, the front end 420 of the compiler 190 again translates 430 the source code 260 into an intermediate code. The intermediate code then enters the back end 440 of the compiler 190 where it is analyzed 450 and partitioned into basic blocks as previously described. Once the intermediate code has been broken into basic block data structures, it is optimized. The optimization during recompilation 410, however, is more intricate. Importantly, the order of operation shown in FIG. 5B is not limiting of the scope of the present invention. Those of ordinary skill in the art will appreciate that these operations can be performed in a number of sequences to achieve the same result without departing from the scope of the present invention. In addition, it will be appreciated that although the compile 270 and recompile 410 steps differ, they can and usually will be accomplished by different subprograms or combinations of subprograms in the same compiler 190.

In the preferred embodiment shown in FIG. 5B, the indirect branch profile data 455 is first used to determine the most-likely target address for each indirect branch 460. This can be accomplished in a number of ways, the most simple of which is to determine for each indirect branch simply the target address most often accessed during the execution 380 of representative data 390. Those skilled in the art will recognize, however, that more complicated profile-based heuristics can be used to determine 460 the most-likely target address for indirect branches, and the present invention is not limited to any particular method for determining 460 the most-likely target address for each indirect branch.

Once the most-likely target address for each indirect branch is determined 460, the compiler 190 quantifies 470 how likely it is that the particular branch will actually branch to the calculated most-likely target address. Again, this likelihood determination 470 can be represented as a single ratio from the profile data 455. The compiler 190 then determines 470 whether that likelihood meets a certain preset threshold of likelihood. It is preferred that the most-likely target address is used only if there is a reasonable chance that the prediction will be correct. If the likelihood of a most-likely target address does not meet a certain threshold, it is assumed that the method of the present invention should be traded off against other optimization techniques, such as those found in prior art. As those skilled in the art will appreciate, the setting of a likelihood threshold and the decision whether to employ other optimization techniques depends on the nature of the program and the availability of other techniques and cannot be quantified. In addition, it depends upon individual compilers, which are specific to both programming languages and to target machines, such as microprocessors.

If the likelihood threshold is not met, the most-likely target address for that indirect branch is ignored 480. However, if the likelihood threshold is met, the compiler generates a target address hint for the indirect branch 490. The target address hint includes both the target address and information indexing that target address to the particular indirect branch for which it is a prediction. However, these profile-based indirect branch target address hints are preferably not yet inserted into the code.

Next, the intermediate code is optimized 500 using standard techniques, as previously described, and rule-based indirect target address heuristics 5 10. The optimization 500 of the intermediate code using rule-based indirect branch target address heuristics 5 10 includes predicting, based on a rule-based heuristic, the most-likely target address for each indirect branch. Again, such heuristics can be very simple (such as predicting that the first target address for each indirect branch is always taken) or more complicated. The present invention is not limited to any particular rule-based heuristic 510. In addition, it is contemplated that several rule-based heuristics 510 could be used in combination to make predictions as to the most-likely target address for each indirect branch. U.S. Pat. No. 5,655,122 to Wu, previously incorporated by reference, discusses methods for utilizing several heuristics in combination. Once the rule-based most-likely target addresses are predicted, the compiler generates rule-based indirect branch target address hints and inserts them 520 into the intermediate code in advance of their corresponding indirect branches.

It is important that the target address hints are inserted 520 into the code far enough in advance of their corresponding indirect branches to permit a processor executing the code to take advantage of the hint. Again, determination of exactly when to insert 520 the hint in relation to its associated indirect branch will depend on the particular program and processor being used. If, for example, a processor 150 requires six computing cycles to execute fully and recognize the hint, and each instruction takes on average two cycles to execute, then the hint needs to be inserted 520 at least three instructions before its corresponding indirect branch. In addition, it is preferred that the hint is inserted 520 in the same basic block data structure as its corresponding indirect branch. Otherwise, there is a risk that the execution flow of control will branch in such a way to miss the indirect branch hint but still execute the indirect branch. Moreover, the hint cannot be inserted 520 too far in advance of the associated indirect branch because, if the processor 150 stores the hinted address in a cache memory 160, it might be overwritten before the indirect branch is executed. Nevertheless, the hint ordinarily can be placed near enough to its associated indirect branch to avoid the overwriting problem of the prior art hardware solution previously discussed.

At this stage, the intermediate code has been optimized 500 using standard techniques and rule-based indirect branch target address heuristics 510. It is preferred, however, that the profile-based target address hints for indirect branches be used whenever those target addresses have met the likelihood threshold discussed above. This is because the profile-based indirect branch hints are assumed to be more accurate than the rule-based hints, especially given that they previously have been tested using a preset likelihood threshold. Therefore, all of the profile-based indirect branch target address hint are inserted 520 into the intermediate code. In doing so, the rule-based indirect branch target address hints are overwritten. In this manner, a hint is provided for every indirect branch, with preference given to profile-based hints over rule-based hints.

Alternatively, the profile-based hints can be used without rule-based hints and/or without the preset likelihood threshold. Moreover, the rule-based hints can be used without the profile-based hints. It is preferred, however, that the two methods are used in conjunction. In addition, it is anticipated that both the rule-based and profile-based generation of indirect branch target address hints can be used in combination with the hardware and software prior art approaches to indirect branch optimization discussed above. The exact combination of these methods is dependent on a variety of factors, and those of ordinary skill in the art will appreciate that the combinations are numerous and most easily approached on an ad hoc basis.

Once all of the rule-based and profile-based indirect branch target address hints have been inserted into the intermediate code, the compiler generates and assembles 530 a second object code 540. Referring back to FIG. 4, that second object code 540 is then forwarded to the linker 200, which links 550 the second object code to create an improved executable object code 560. At this point the improved executable object code 560 is ready to be executed 570. However, if desired, the improved executable object code 560 can be re-executed 380 with representative data 390 and the optimization process can be repeated. If the optimization process is to be repeated, the object code needs to be reinstrumented during recompilation.

Figure 6:
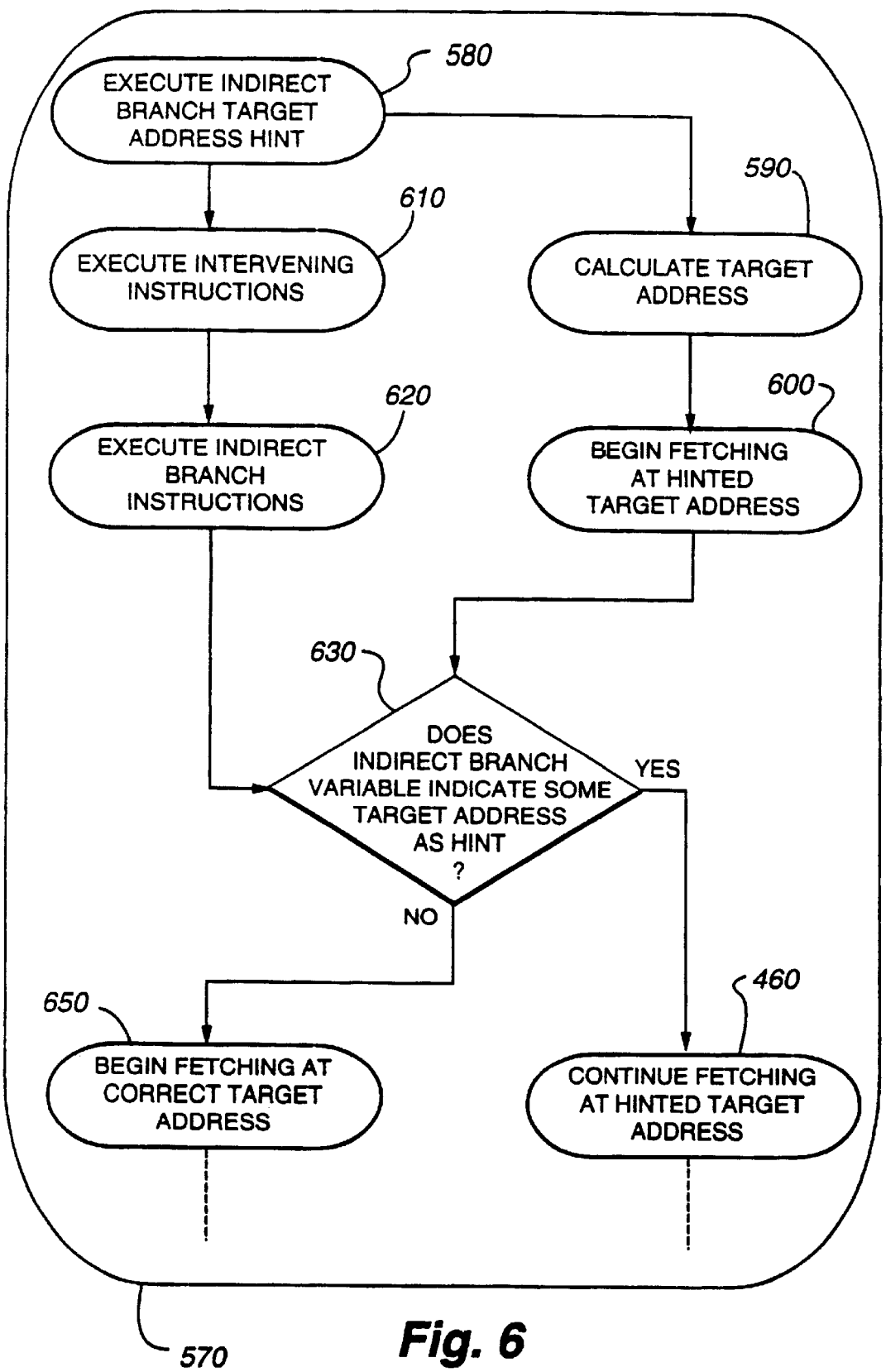
FIG. 6 is a more detailed illustration of the execute step shown in FIG. 4.

When the improved executable object code is executed 570, the indirect branch target address hints will be utilized as shown in FIG. 6. When the indirect branch target address hint is executed 580 by the CPU 150, the CPU 150 begins to calculate 590 the target address contained in the target address hint. The calculation 590 of the target address involves adding or subtracting to the program counter to reach the target address contained in the hint instruction. The processor then begins fetching 600 instructions at the hinted target address. The execution 580 of the indirect branch target address hint, including the calculation 590 of the target address and the fetching 600 of instructions at the hinted target address, is preferably done in parallel with execution 610 of intervening instructions between the hint and its associated indirect branch instruction 620. This parallelism is made possible by the emergence in recent years of "wide-issue processors." Modern processors utilize several parallel pipelines. However, often not all pipelines are being used simultaneously because instructions that depend on one another cannot be processed in parallel. Therefore, the execution 580 of the indirect branch target address hint can often be "hidden" by the processor if it is executed in a parallel pipeline that would not otherwise have been used. The decision whether to execute a particular instruction in parallel with others is generally made in the firmware of the processor. It is preferred according to the present invention that the firmware be modified to execute 580 indirect branch target address in hints in parallel with intervening instructions 610 whenever possible.

Once the indirect branch instruction is executed 620, the CPU 150 must decide 630 whether the indirect branch variable indicates the same target address as the hint. If so, the CPU 150 will continue fetching 640 at the hinted target address, thereby saving valuable processing time. If not, the processor will calculate and begin fetching 650 at the correct target address.

The present invention has been described in relation to preferred embodiments. Those of ordinary skill in the art will recognize that modifications to the methods and apparatus described herein can be made without departing from the scope of the invention. Accordingly, the present invention should not be limited except by the following claims:

We claim:

1. A method of reducing branch instruction overhead, comprising:

analyzing a compiled code of a program to find an indirect branch instruction;

collecting an associated branch profile data for the indirect branch instruction; and, determining a most-likely target address for the indirect branch instruction in response to the associated branch profile data during a recompilation of the compiled code to create a second code.

2. The method of claim 1, further comprising:

determining a likelihood that the most-likely target address is correct in response to the associated branch profile data during the recompilation; and generating a profile-based target address hint for the most-likely target address in response to the likelihood that the most-likely target address is correct meets a threshold during the recompilation.

3. The method of claim 2, wherein the step of generating includes:

generating and inserting a rule-based target address hint based on at least one heuristic, in advance of the indirect branch instruction; and overwriting the rule-based target address hint in response to the likelihood that the most-likely target address is correct meeting the threshold.

4. The method of claim 2 wherein the step of generating includes:

overwriting a previous rule-based target address hint in response to the likelihood that the most-likely target address is correct meets a threshold during the recompilation.

5. The method of claim 4 wherein the substep of inserting further comprises:

inserting the profile-based target address hint far enough in advance of the indirect branch to allow a processor executing the second code to utilize the profile-based target address hint.

6. The method of claim 3, wherein the substep of inserting the profile-based target address hint comprises inserting the profile-based target address hint far enough in advance of the indirect branch to allow a processor executing the second code to utilize the profile-based target address hint.

7. The method of claim 1, further comprising:

executing the second code, wherein the step of executing the second code includes a substep of executing the profile-based target address hint in parallel with other instructions in the second code.

8. The method of claim 7, wherein the substep of executing the profile-based target address hints includes storing the most-likely target addresses in a cache memory such that each calculated most-likely target address is available when its corresponding indirect branch is executed.

9. A computer system utilizing a target address hint to minimize the effect on processing speed of indirect branches in a code of a program, comprising:

a compiler configured to collect an associated branch profile data for an indirect branch instruction and to recompile the code of the program to determine a most-likely target address for the indirect branch instruction in response to the associated branch profile data during the recompilation of the code of the program, thereby creating a second code.

10. The computer system of claim 9, wherein the compiler is further configured to determine a most-likely target address for the indirect branch instruction from the associated indirect branch profile data, and a likelihood that the most-likely target address is correct, wherein the compiler generates a profile-based target address hint in response to the likelihood that the most-likely target address for the indirect branch instruction meets a threshold.

11. The computer system of claim 10, wherein the compiler is further adapted, for those indirect branches where the likelihood of the most-likely target address does not meet the certain threshold, to generate rule-based target address hints based on at least one heuristic.

12. The computer system of claim 9, wherein the compiler is further configured to insert the profile-based target address hint into the second code far enough in advance of an indirect branch instruction so that the processor can utilize the profile-based target address hint.

13. The computer system of claim 9, wherein the compiler is further configured to execute the profile-based target address hint in parallel with other instructions in the second code.

14. The computer system of claim 9, further comprising:
a cache memory, operatively connected to the processor, wherein the processor is further adapted to execute the target address hint by storing the addresses contained in the target address hint in the cache memory such that they are available to the processor when corresponding indirect branches are executed.

15. The computer system of claim 9, further comprising:
a linker configured to link the second code from the compiler to create an indirect-branch optimized executable code; and
a processor configured to execute the indirect-branch optimized executable code with the profile-based target address hint.

16. The computer system of claim 9, wherein the second code is an intermediate code that is recompiled to create a second object code.

17. A method of reducing indirect branch instruction overhead, comprising:
recompiling a code of a program to create a second code;
determining a most-likely target address for an indirect branch instruction for the second code; and
calculating a likelihood that the most-likely target address will be correct.

18. The method of claim 17, further comprising:
generating a profile-based target address hint in response to the likelihood of the most-likely target address meeting a threshold.

19. The method of claim 17, wherein the second code is an intermediate code that is recompiled to create a second object code.

20. A method of reducing indirect branch instruction overhead, comprising:
recompiling a code of a program to create a second code; and
generating a profile-based target address hint for a most-likely target address of an indirect branch instruction during recompilation of the code, in response to a likelihood of the most-likely target address meets a threshold.

21. The method of claim 20, wherein the likelihood of the most-likely target address is calculated based on a profile-based target address hint for the indirect branch instruction of the second code.

22. The method of claim 20, further comprising:
generating a rule-based target address hint based on at lease one heuristic in response to the most-likely target address hint not meeting the threshold.

23. The method of claim 20, wherein the second code is an intermediate code that is recompiled to create a second object code.

24. A computer system utilizing a target address hint to minimize the effect on processing speed of indirect branches in a code, comprising:
a compiler configured to determine a most-likely target address for an indirect branch instruction of the code and to calculate a likelihood that the most-likely target address will be correct during recompilation of the code to create the second code.

25. The computer system of claim 24, wherein the second code is an intermediate code that is recompiled to create a second object code.

26. The computer system of claim 24, further comprising:
a linker configured to link the second code from the compiler to create an indirect-branch optimized executable code; and
a processor, operatively connected to the compiler and to the linker, configured to execute the indirect-branch optimized executable code, including the indirect branch target address hint.

27. A computer system utilizing a target address hint to minimize the effect on processing speed of indirect branches in a code, comprising:
a compiler configured to recompile a code of a program to create a second code, wherein, during such recompilation, the compiler is further configured to generate a profile-based target address hint for a most-likely target address of an indirect branch instruction of the second code in response to a likelihood of the most-likely target address meets a certain threshold.

28. The computer system of claim 27, further comprising:
a linker, operatively connected to the compiler, adapted to link the second code to create an indirect-branch optimized executable code; and
a processor, operatively connected to the compiler and to the linker, configured to execute the indirect-branch optimized executable code, including the indirect branch target address hint.

29. The computer system of claim 28, wherein the processor is further configured to insert the target address hint into the second code far enough in advance of a corresponding indirect branch so that the processor can utilize the target address hint.

30. The computer system of claim 28, wherein the processor is further configured to execute the target address hint in parallel with other instructions in the second code.

31. The computer system of claim 27, wherein the compiler is further configured, for an indirect branch where the likelihood of the most-likely target address does not meet the threshold, to generate a rule-based target address hint based on at least one heuristic.

32. The computer system of claim 27, wherein the second code is an intermediate code that is recompiled to create a second object code.

* * * * *